United States Patent Office 3,046,927
Patented July 31, 1962

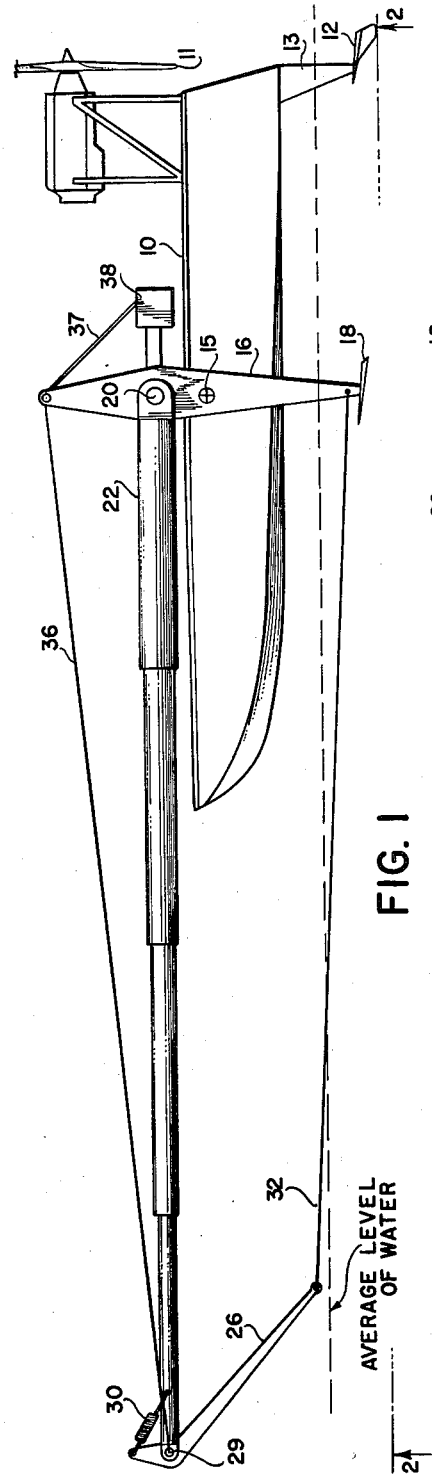
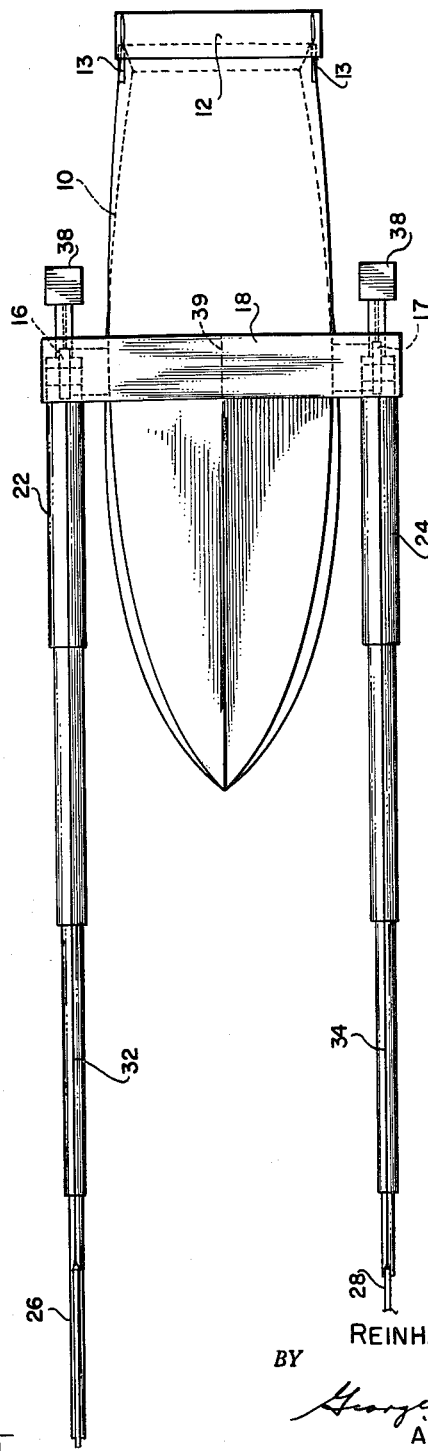

3,046,927
HYDROFOIL VEHICLE
Reinhard N. Lahde, Tarzana, Calif., assignor to Lockheed Aircraft Corporation, Burbank, Calif.
Filed Dec. 27, 1960, Ser. No. 78,675
8 Claims. (Cl. 114—66.5)

The present invention relates to a hydrofoil vehicle, more particularly it relates to depth control means for a hydrofoil vehicle.

A hydrofoil vehicle is one which supports itself on hydrofoils extended below the hull of the vehicle, as it travels above the surface of the water. There are several methods of depth control in hydrofoil vehicles. Where surface piercing hydrofoils are used, depth control is effected through the shape of the hydrofoil itself, in that lift is dependent on the degree of submersion. In the case of submerged hydrofoils, the same principle is sometimes used by arranging an array of lifting surfaces at different levels, so that as the depth increases the number of surfaces submerged and thereby the lift increases.

These devices have a basic drawback in that they provide a rather rough ride in the presence of appreciable waves, which makes it difficult, if not impossible, to design a vehicle of the type described for rough sea. In order to provide a smooth ride, in the presence of waves, it is necessary to have the lifting surfaces submerged at all times, and have no other lifting surfaces or parts of the vehicle or ship contact the peaks of the waves. This requires some sort of depth control to prevent the lifting surfaces from coming out of the water at the lowest valleys of the surface of the sea.

It has been suggested that an autopilot be used to accurately control the pitch attitude of the hydrofoil vehicle. This, then, would make it easier to effect depth control since the rate of change of depth would be very small and the altitude of the ship over the lower spots of the surface of the sea could be measured with a large time-lag permitting relatively simple means. However, this solution has these complications: the autopilot is expensive and heavy, it is unreliable or its reliability must be assured by redundancy which requires or means more cost and more complication. Servo-actuators to change the angle of attack of the submerged hydrofoils would be necessary, plus necessary power supply, plumbing and mechanical linkages to those hydrofoils from the servo-actuator. There would be a necessity to provide means to measure the altitude of the lowest valleys in the sea.

One method for depth control has been attempted in which some fully submerged hydrofoils are arranged a small distance behind the center of gravity of the vehicle. The ship has a sort of water ski arrangement extending ahead of the center of gravity, which serves several purposes. The water skis ahead provide a rough reference position for the bow of the ship or the hydrofoil relative to the sea's surface, and permits the lifting surfaces to trail behind them, thus seek a stable depth level. While it is true that the inventions involving water skis ahead of the center of gravity of the craft may achieve a certain amount of averaging, all suffer from the main drawback that the water level is determined at a particular, rather narrow location some distance ahead of the boat, and that the length of the "feeler," or ski, is necessarily relatively small as compared to the length of the longest waves, which would be desirable to average out. The faster the ship travels, the longer are those waves in regards to which an averaging is desired. Any device which is much shorter than the length of the longest critical waves is very limited in its averaging effectiveness. This method also provides a rough ride which could be somewhat smoother by making the water skis very long and shaping them such that they sort of integrate out the waves and seek a level more representative of the average surface. However, if high speeds and high performance are required, this method is still far from satisfactory, mainly because it requires large surface lengths and structures to be submerged or partially submerged in the water, thereby generating a great deal of drag.

The long wire or cable is the logical means to combine the two opposing requirements, namely, a large length of a predictor and a low drag at high speed, even in submerged or partially submerged conditions.

It is an object of this invention to provide a hydrofoil vehicle depth control means which will provide for a smooth ride in a rough sea. Means extend in front of the vehicle to integrate out the wave heights rather than ride on top of them, providing for less pitching of the vehicle.

It is another object of this invention to provide a hydrofoil depth control device for a hydrofoil vehicle having very low drag. The hydrofoil depth-sensing means is a relatively thin wire stretched more or less parallel to the surface of the sea.

It is another object of this invention to provide a hydrofoil depth control means which may be adjusted according to the state of the sea. Forwardly extending depth control means are telescopically adjustable so that their length may be changed according to the height of the waves.

It is another object of this invention to provide a hydrofoil depth control which is applicable to all kinds of water craft, large or small, and to any kind of propulsion system used therewith.

A more complete understanding of the invention can be had from a reading of the following specifications and taken in conjunction with the appended drawings.

FIGURE 1 is a side view of a typical hydrofoil vehicle embodying the elements of the present invention.

FIGURE 2 is a view of the underside of FIGURE 1 taken on lines 2—2 of FIGURE 1.

The subject invention circumvents the difficulty of high drag and the narrow averaging length by using a long, thin wire or cable as a means to sense the average level of the sea in the presence of waves. In FIGURE 1, the body of the vehicle body 10 is shown equipped with an air propeller 11. A hydrofoil 12 is attached to struts 13 on the lower aft end of body 10. Struts 16 and 17 are pivoted to body 10 at about the center of gravity 15. They extend above and below the body 10 and carry hydrofoils 18 on their lower ends. Struts 16 and 17 and telescoping rods 22 and 24 are pivoted at axis 20. Rods 22 and 24 extend forwardly of the body 10. Jockey arms 26 and 28 are pivoted to the forward end of the telescoping rods 22 and 24 about a transverse axis 29 intermediate their ends. A wire 32 is attached between the lower end of jockey arm 26 and the pivoted strut 16 near the hydrofoil 18. The wire 34 extends from the lower end of jockey arm 28 to the lower end of pivoted strut 17 near the hydrofoil 18 on the opposite side of the vehicle. It should be noted that wires 32 and 34 may be cables, rods, straps or any long thin members. Springs 30 attached to the upper end of the jockey arm and the telescoping rods 22 and 24 bias the lower end of the arms 26 and 28 forwardly to hold wires 32 and 34 under tension. Cables 36, 37 and counterbalances 38 are provided to balance the forwardly extending rods 22 and 24.

The motion of the structure up or down is translated directly through the wires 32 and 34 to control the angle of attack of the submerged hydrofoil 18. Submerged hydrofoil 18 may be sufficiently resilient to take a small amount of twisting so that, should there be a difference in height of waves sensed by wires 32 and 34, the hydrofoil 18 would be twisted to maintain an even keel. An alternative arrangement would split hydrofoil 18 as shown by the broken line 39 so that each side would move independently of the other. It is obvious that the hydrofoil 18 must be arranged close to the center of gravity in this case.

The weight of the counterbalances 38 for the rods 22 and 24 can be averaged to provide the right amount of buoyancy necessary for the wires 32 and 34 to seek the level so that in rough sea, the shorter waves hit only a small part of the wire so that these waves simply will be ignored by the depth control. Only the longer waves, which have amplitudes which, if not controlled out, will cause the water to hit the body 10 will be sensed and will cause the vehicle to rise to avoid the hitting. The result is a much smoother ride.

The spring 30 is shown to bias the lower end of the jockey arms 26 and 28 forwardly. This would permit the achievement of a desirable condition in that the degree of submergence of the feeler wires 32 and 34 would become almost independent of the speed of the vehicle.

Simple depth control means for a hydrofoil vehicle of any size which will provide a smooth ride in even the roughest state of sea has been disclosed. The averaging means disclosed presents very little drag permitting utilization of the high performance capability of the submerged hydrofoils.

Having disclosed the details around which my invention may be practiced, I claim the following combinations and their equivalents as my invention.

1. A hydrofoil vehicle including a body, a vertical strut extending below the body, a hydrofoil on the lower end of the vertical struct, a longitudinal rod extending forwardly of the body substantially parallel thereto, a jockey arm pivoted intermediate its ends on the forward end of the longitudinal rod, a wire fixed between the lower end of the jockey arm and the vertical strut in the vicinity of the hydrofoil, and spring means to bias the lower end of the jockey arm forwardly so as to maintain tension in the wire.

2. A hydrofoil vehicle including a body, propulsive means on the body, a plurality of vertical struts extending below the body, hydrofoils on the lower ends of the vertical struts, means to pivot at least one of the vertical struts on the body about an axis transverse to the body, a forwardly extending rod pivoted to the body, a jockey arm pivoted intermediate its ends to the forward end of the forwardly extending rod, a wire attached to the lower end of the jockey arm and extending aft to a point of attachment on the pivoted vertical strut adjacent its hydrofoil.

3. A hydrofoil vehicle including a body, propulsive means on the body, vertically extending struts on either side of the body pivoted to the body on an axis transverse to the body, a hydrofoil fixed to the lower ends of each strut, a telescoping rod pivoted to the body and extending a relatively large distance in front of the body, a jockey arm pivoted intermediate its ends to the front of the rod, a wire extending from the lower end of the jockey arm to the lower end of a strut adjacent the hydrofoil, means to bias the lower end of the jockey arm forwardly to maintain a tension in the wire, and counterbalance means to balance the forwardly extending rod so that it is substantially parallel to the surface of the water.

4. A hydrofoil vehicle including a body, propulsion means on the body, fixed struts downwardly extending from the body, a hydrofoil fixed to the lower end of the fixed struts, pivoted struts pivoted about an axis transverse to the body intermediate its ends, hydrofoils fixed to the lower ends of the pivoted struts, telescoping rods forwardly extending from the body, a jockey arm pivoted intermediate its ends on each forwardly extending rod, a wire fixed to the lower end of each jockey arm and extending aft to the lower end of each pivoted strut, means to bias the lower end of the jockey arm forwardly so as to maintain tension in the wire and means to counterbalance the forward extending rods.

5. A hydrofoil vehicle including a body, a vertical strut pivoted to and extending below the body, a hydrofoil fixed to the lower end of the vertical strut, a longitudinal rod pivoted to and extending forwardly of the body substantially parallel thereto, a jockey arm on the forward end of the rod extending downwardly therefrom, a wire fixed between the lower end of the jockey arm and the vertical strut in the vicinity of the hydrofoil so that the wire will sense the height of the waves to adjust the hydrofoil about its pivot, so that the body of the vehicle will clear the waves.

6. A hydrofoil vehicle including a body, a hydrofoil spaced below the body, means to pivot the hydrofoil about an axis transverse to the body, means to extend a wire from a point in front of the body to the hydrofoil in a taut fashion so that the wire will sense the average height of the oncoming waves so as to change the angle of attack of the hydrofoil about its pivot so that the body will be caused to clear the tops of the waves in a smooth manner.

7. A hydrofoil vehicle including a body, propulsive means on the body, a plurality of vertical struts extending below the body, hydrofoils on the lower ends of the vertical struts, means to pivot at least one of the vertical struts on the body about an axis transverse to the body, a forwardly extending rod pivoted to the body, means to stretch a wire from the forward end of the forwardly extending rod to the lower ends of the pivoted struts adjacent to the hydrofoils attached thereto in such a manner so that the wire will sense the average height of the waves ahead of the vehicle to pivot the hydrofoil to change its angle of attack in the water to govern the altitude of the body above the waves.

8. A hydrofoil vehicle including a body, propulsive means on the body, a plurality of vertical struts extending below the body, hydrofoils on the lower ends of the vertical struts, means to pivot two of the struts on either side of the body at approximately its center of gravity about a transverse axis, means to support a relatively taut wire in front of the body on either side thereof which slants backwardly and downwardly to attach to the lower end of each pivoted strut, so that the forwardly inclined wire will average out the heights of the waves ahead of the vehicle, changing the attitude of the hydrofoil fixed to the pivoted struts in such a manner as to provide a smooth ride for the vehicle.

References Cited in the file of this patent

UNITED STATES PATENTS

| 2,603,179 | Gardiner | July 15, 1952 |
| 2,722,189 | Hobday | Nov. 1, 1955 |
| 2,795,202 | Hook | June 11, 1957 |

FOREIGN PATENTS

| 292,353 | Germany | June 7, 1916 |